United States Patent [19]

Wattles

[11] Patent Number: 4,618,120
[45] Date of Patent: Oct. 21, 1986

[54] PORTABLE LECTERN

[76] Inventor: Jervis J. Wattles, 16231 W. 14 Mile Rd., Birmingham, Mich. 48009

[21] Appl. No.: 705,319

[22] Filed: Feb. 25, 1985

[51] Int. Cl.⁴ ................................................ A47F 5/16
[52] U.S. Cl. .................... 248/460; 211/189; 312/140; D6/419
[58] Field of Search ............... 211/189, 190, 186, 187; D6/419, 420, 429, 430; 108/27, 32; 248/460, 461, 441.1, 205.2; 312/140, 263; 24/442, 306

[56] References Cited

U.S. PATENT DOCUMENTS

| | | | |
|---|---|---|---|
| 1,247,443 | 11/1917 | Nones | 312/140 |
| 2,176,178 | 10/1939 | Herfort | 248/441.1 |
| 2,240,729 | 5/1941 | Palmenberg | 312/140 X |
| 2,936,904 | 5/1960 | Streater | 108/32 X |
| 3,056,230 | 10/1962 | Brokaw | 248/460 |
| 3,343,776 | 9/1967 | Wieszeck | 248/441.1 |
| 3,455,589 | 7/1969 | Valiolis | 24/442 X |
| 3,458,242 | 7/1969 | Williams | 312/263 X |
| 3,571,999 | 3/1971 | Downing | 24/442 X |
| 3,998,509 | 12/1976 | Hauser | 312/263 |

OTHER PUBLICATIONS

Smith System brochure, pp. A-D, Jul. 6, 1971.

Primary Examiner—Robert W. Gibson, Jr.

[57] ABSTRACT

A portable lectern is formed from a plurality of pieces joined at their edges by right angle joining strips to form a base. The lectern has a top adapted to hold notes and the like. The top is held in place by fasteners. A shaped corner piece is used to hold the lower corners of the pieces which form the base member.

7 Claims, 4 Drawing Figures

U.S. Patent     Oct. 21, 1986     4,618,120
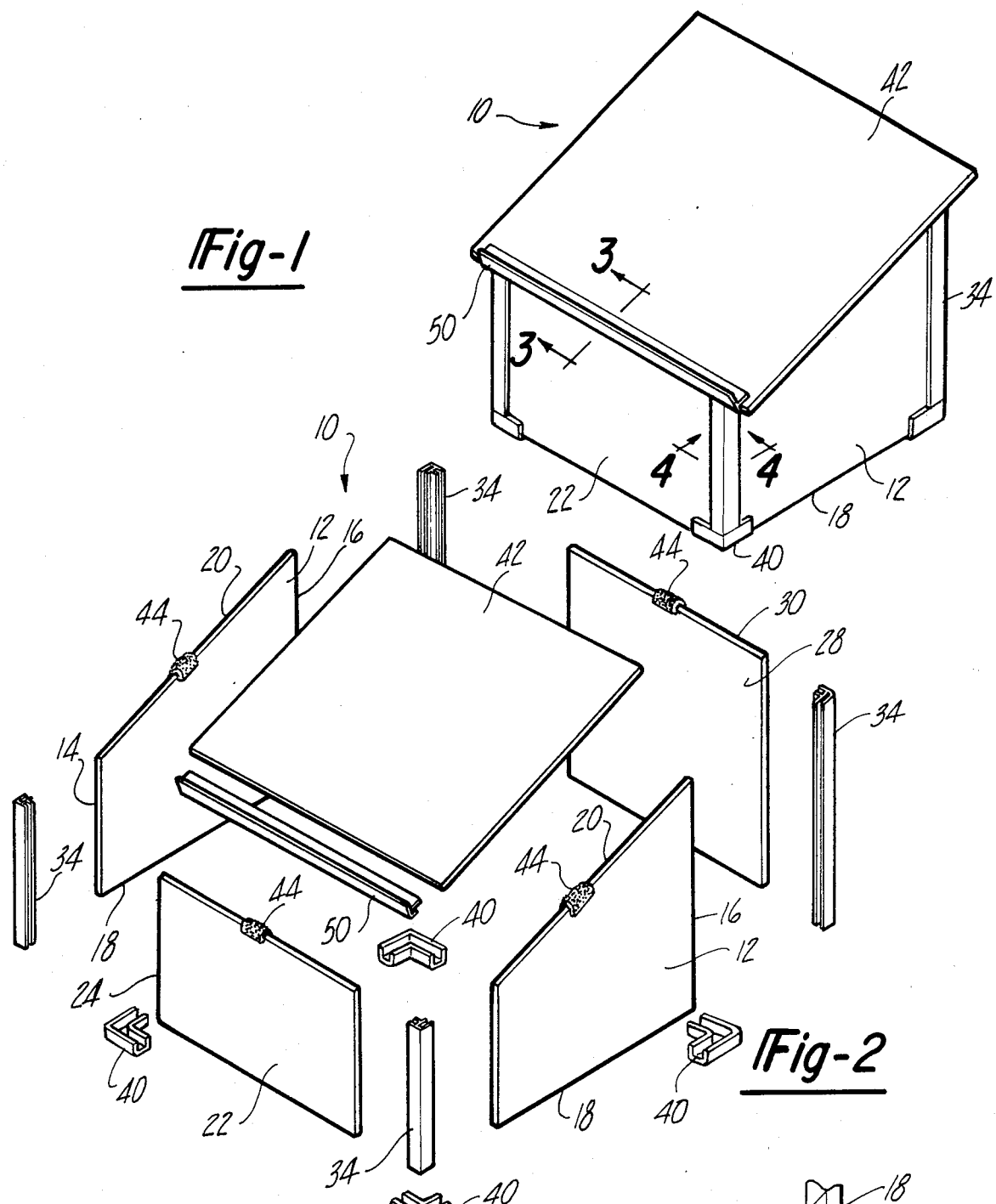
*Fig-1*
*Fig-2*
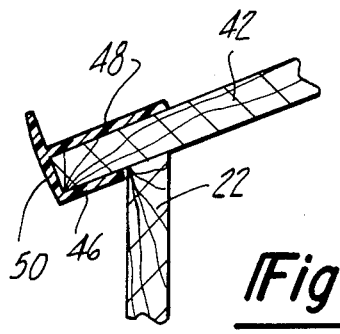
*Fig-3*
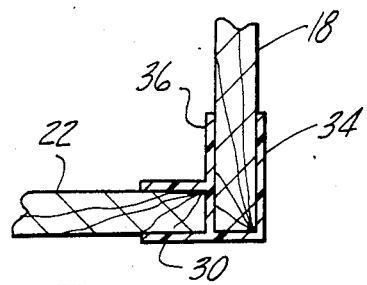
*Fig-4*

PORTABLE LECTERN

In one aspect this invention relates to lecterns used by speakers.

In a further aspect this invention relates to portable lecterns which can be diassembled and stored.

In general, lecterns are used by speakers, teachers, trainers, and the like to hold notes etc. during a speech. The prior art lecterns are generally fashioned from wood or wood products as a solid piece of furniture capable of standing without additional support. Such structures are by their nature large and bulky. The bulk and size makes the pieces difficult to store and their rigid construction makes dissassembly impossible.

In an attempt to overcome the difficulties of a rigid structure, folding or collapsible lecterns of cardboard and similar materials have been produced. These devices while providing a portable structure, also lack the strength and rigidity necessary to hold heavy objects or books.

It would be desirable to have a portable lectern which has the strength and rigidity of a permanent lectern and the portability of the cardboard lecterns.

The lectern of the present invention provides a lectern which is portable and also sturdy. The lectern has two sides shaped as trapezoids with one of the nonparallel sides being formed at right angles to the parallel sides to form a base side. The fourth side is formed at an angle to the parallel sides and base. A front member is formed as a rectangle with the width of the rectangle being the width of the lectern and the height being equal to the shorter side of the trapezoid. A back member is formed with its width equal to the width of the lectern and its height equal to the longer side of the trapezoid. The sides are held together by means of elongated fasteners which grip adjacent edges of the sides, front, and back holding the pieces in an orthogonal relationship to form a base structure. The base portions form a solid base and the slanted sides and edges of the front and back together define a plane disposed at an angle to the horizontal. A top member is mounted on the slanted or upper surfaces to form a holding surface for notes and the like. The top member is held in place by fastening means which can be engaged to hold the parts of the lectern together. After use, the fasteners can be disengaged to permit the pieces of the lectern to be stored flat. The lower corners at the base level are held by right angle channels having a c shaped cross section to confer additional rigidity.

In the accompanying drawing:

FIG. 1 is a perspective view of a lectern according to this invention;

FIG. 2 is an exploded view of the lectern of FIG. 1;

FIG. 3 is a sectional view taken along the line 3—3 of FIG. 1;

FIG. 4 is a sectional view taken along the line 4—4 of FIG. 1.

Referring to the accompanying drawing in which like numerals refer to like parts, and initially to FIGS. 1 and 2 a portable lectern according to this invention is denoted generally 10. The lectern 10 has a pair of sides 12 which are trapezoidal in structure having a relatively shorter front edge 14 and a relatively longer back edge 16. Front and back are in reference to the person using the lectern who would be at the front. The trapezoidal sides 12 have one nonparallel edge 18 which is perpendicular to the parallel sides and forms a base edge. The remaining edge 20 is formed at a slant to the parallel sides as shown in the drawings. The angle relative to the parallel sides is not critical but in the assembled configuration, the notes being held should be easily read by the user.

The front 22 has its shorter edges 24 vertically disposed and of the same length as the edges 14 of the trapezoidal sides 12 so that when the panels are juxtaposed, they will make a seam. The other edges 26 of the front panel 22 are formed to provide the desired width of the lectern.

The lectern has a back panel 28 with one set of edges 30 the same size as the front panel's edges 26. This establishes the width of the lectern. The other edges of the back panel correspond to the length of the edges 16 of the side panels 12.

As shown, the side panels, front panel, and the back panel are joined by means of joining strips 34 of material shaped so as firmly grip two adjacent panels. The joint structure is shown more fully in FIG. 4. The joining strip 34 has one pair of parallel arms 36 extending along the sides of the side panel 18 to grasp the edge of the side panel firmly. A second set of parallel arms 38 is disposed along the sides of the juxtaposed front panel 22. The strips 34 hold the panels in an orthogonal configuration with respect to each other. When all the panels are firmly grasped by the joining strips 34, the resulting four sided box forms a base suitable for placement on a table or the like.

To further strengthen the base, corner braces 40, having a c shaped cross-section like those shown in FIG. 2, can be used. The corner braces grip the adjacent panel in a manner similar to the joining strips but will generally be more resistant to panel separation and will further rigidify the lectern.

Once a base is assembled by joining the front, back, and side panels, the top panel 42 is placed on the base assembly. The top can be held in place; one example of a suitable fastening system is the hook and eye fastening system commonly available under the trademark Velcro ®. One portion of the fastener is shown as 44 in FIG. 2. The other portion of the fastener would be on the underside of the top panel 42 and is not visible in the drawing. A more detailed description is omitted in the interest of brevity.

The top panel will have a retaining ledge associated with the front edge of the top to hold papers and the like on top of the lectern. As shown in FIG. 3, the retaining ledge has a pair of parallel lips 46, 48 which are disposed along the front edge of the top panel 42 the longer lip 48 extending along the upper surface to a point some what beyond the point at which the front panel 22 and the top panel 42 are joined. The retaining portion of the retaining ledge is formed by a strip 50 which joins the lips 46, 48 and extends past the lips in the form of a approximately right angle projection. The extension will hold papers and the like on the upper surface of the lectern.

The various panels can be made from standard pressed board of various thicknesses and having differing types of surface finish. Pressed boards having woodgrain finishes are particularly desireable since they give the rich look of wood but form a light weight portable structure. The joining parts can be formed of different plastics polypropylene being a preferred plastic because of its low cost and good strength.

Various modifications of this invention are possible and I am limited only by the claims below.

What is claimed is:

1. A lectern which can be disassembled to component pieces for storage and transportation including: a pair of trapezoidal side panels having one of the nonparallel sides formed at a right angle to the parallel sides to act as a base portion for the lectern, a rectangular front panel having one set of sides approximately the same size as the shortest of the parallel sides of the trapezoidal side panels and a width equal to the desired width of the lectern, a back panel having a pair of sides approximately equal to the length of the longest side of the trapezoidal side panels and the second sides of the back panel being equal to the width of the lectern, a plurality of joining strips, the joining strips having a first set of parallel lips extending along the side of the panel, the lips being spaced and adapted to grip the edge of a panel, and a second set of parallel lips disposed at right angles to the first lips and adapted to extend along and grip the edge of a second panel juxtaposed the panel held by the first lips, a top panel disposed on a slanted plane formed by the upper edges of the assembled panels, and fastening means adapted to hold the top panel on the assembled base.

2. The lectern of claim 1 having right angle corner braces on the lower corners of the angles of the base porton of the lectern, said braces having a c-shaped cross section adapted to grip juxtaposed panels of the lectern and hold it in a rigid condition.

3. The lectern of claim 1 wherein the panels of the lectern are formed of tempered hardboard.

4. The lectern of claim 3, wherein said hardboard has a wood grain finish.

5. The lectern of claim 1, wherein the fastening means are hook and eye type facteners adapted to hold when brought into engagement and can be separated by hand.

6. The lectern of claim 1 having a retaining ledge disposed on the edge of the top panel near the front of the lectern.

7. The lectern of claim 6, wherein the retaining ledge comprises a pair of lips adapted to firmly grip a portion of the top panel extending past the front of the lectern and having a strip which joins the lips and extends therefrom so as to form an approximately right angle projection to the lips and the upper surface of the top panel.

* * * * *